(12) United States Patent
Beerling et al.

(10) Patent No.: US 6,873,756 B2
(45) Date of Patent: Mar. 29, 2005

(54) TILING OF OPTICAL MEMS DEVICES

(75) Inventors: Timothy E. Beerling, Berkeley, CA (US); Michael J. Daneman, Pacifica, CA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 09/949,210

(22) Filed: Sep. 7, 2001

(65) Prior Publication Data

US 2003/0048979 A1 Mar. 13, 2003

(51) Int. Cl.$^7$ .............................................. G02B 6/26
(52) U.S. Cl. ............................................. 385/18; 3854/14
(58) Field of Search ................................ 385/18, 14, 15, 385/16, 17

(56) References Cited

U.S. PATENT DOCUMENTS

| | | | | |
|---|---|---|---|---|
| 4,153,329 | A | | 5/1979 | Gillette .................... 350/96.13 |
| 4,580,873 | A | | 4/1986 | Levinson ................... 350/96.2 |
| 5,138,309 | A | | 8/1992 | Gonzalez et al. ........... 340/783 |
| 5,629,918 | A | | 5/1997 | Ho et al. .................... 369/112 |
| 5,841,917 | A | | 11/1998 | Jungerman et al. ........... 385/17 |
| 6,123,410 | A | | 9/2000 | Beerling et al. .............. 347/42 |
| 6,314,887 | B1 | * | 11/2001 | Robinson .................... 102/262 |
| 6,387,793 | B1 | * | 5/2002 | Yap et al. .................... 438/612 |
| 6,388,631 | B1 | * | 5/2002 | Livingston et al. .......... 343/767 |
| 6,396,975 | B1 | * | 5/2002 | Wood et al. .................. 385/18 |
| 6,417,807 | B1 | * | 7/2002 | Hsu et al. ............ 343/700 MS |
| 6,445,840 | B1 | * | 9/2002 | Fernandez et al. ............ 385/17 |
| 6,445,841 | B1 | * | 9/2002 | Gloeckner et al. ............ 385/17 |
| 6,504,968 | B1 | * | 1/2003 | Zhu et al. ..................... 385/18 |
| 6,529,652 | B1 | * | 3/2003 | Brener ......................... 385/16 |
| 2003/0002265 | A1 | * | 1/2001 | Simmons | |
| 2002/0163053 | A1 | * | 11/2002 | Behin et al. | |

FOREIGN PATENT DOCUMENTS

| | | | |
|---|---|---|---|
| EP | 1120677 | 8/2001 | .......... G02B/26/02 |
| WO | 0073842 | 7/2000 | .......... G02B/26/02 |
| WO | WO0073842 | 7/2000 | .......... G02B/26/02 |
| WO | WO0057233 | 9/2000 | .......... G02B/26/00 |
| WO | 0057233 | 9/2000 | .......... G02B/26/00 |
| WO | WO 00/57233 | * 9/2000 | |

OTHER PUBLICATIONS

J. Minowa, Y, Fujii, Y. Nagata, Nonblocking 8×8 Optical Matrix Switch For Fibre–Optic Communication, Apr. 22, 1990, pp. 422–423.

Provisional U.S. Appl. No. 60/123,496 of Behrang Behin et al., "Global Mechanical Stop for Precise Positioning of a Field of Mirrors", filed Mar. 9, 1999.

(Continued)

*Primary Examiner*—K. Cyrus Kianni
(74) *Attorney, Agent, or Firm*—JDI Patent; Joshua D. Isenberg

(57) ABSTRACT

An optical microelectromechanical system (MEMS) device and a method for making it are disclosed. The device generally includes a substrate with two or more device dies attached to the substrate. Each device die includes one or more MEMS optical elements. A common clamping die is attached to the device dies such that each MEMS optical element aligns with a corresponding clamping surface on the common clamping die. The single larger clamping die, which covers all the elements on the smaller device dies, forces mirrors contained thereon to register accurately, in the "ON" state. Such a device may be made by attaching two or more device dies to a substrate, and attaching a common clamping die to the two or more device dies. The device dies may be attached to the substrate before attaching the common clamping die to the device dies. Alternatively, the common clamping die may be attached to the device dies before the device dies are attached to the substrate. High yields may be achieved since simple semiconductor process may be used to fabricate the larger clamping die.

13 Claims, 3 Drawing Sheets

OTHER PUBLICATIONS

L. Y. Lin, et al, Free Space Micromachined Optical Switches with Submillisecond Switching Time for Large–Scale Optical Crossconnects, IEEE Photonics Technology Letters, vol. 10, No. 4, Apr. 1998.

U.S. Appl. No. 09/489,264 of Robert L. Wood et al, "MEMS Optical Cross–Connect Switch", filed Jan. 20, 2000.

U.S. Appl. No. 09/511,428 of Behrang Behin et al. "Cantilevered Microstructure Methods and Apparatus", filed Feb. 23, 2000.

L. Y. Lin, et al, "High–Density Micromachined Polygon Optical Crossconnects Exploiting Network Connection–Symmetry", IEEE Photonics Technology Letters, vol. 10, No. 10, Oct. 1998.

D.E. Ludwig, "Multilayered Focal Plane Structures with Self–Aligning Detector Assembly", Infrared Readout Electronics III, SPIE, vol. 2745, 1996, pp. 149–158.

W.R. Imler et al, Precision Flip–Chip Solder Bump Interconnects for Optical Packaging, IEEE Transactions on Components, Hybrids, and Manufacturing Tech., vol. 15, #6, 1992, pp. 997–982.

M. Itoh, et al. "Use of AUSn Solder Bumps in Three–Dimensional Passive Aligned Packaging of LD/PD Arrays on Si Optical Benches", IEEE Electronic Compounds and Technology Conf., 1996, pp 1–7.

C. Kallmayer, et al., "Experimental Results on the Self–Alignment Process Using Au/Sn Metallurgy and on the Growth of the ζ–Phase During the Reflow", Flip–Chip, BGA, TAB & AP Symposium, 1995, pp. 225–236.

R.D. Deshmukh, et al. "Active Atmosphere Solder Self–Alignment and Bonding of Optical Components", Intl. Hournal of Microcircuits and Electronic Packaging, vol. 16, #2, 1993, pp. 97–107.

M. Oda, M Shirashi, "Mechancially Operated Optical Matrix Switch", Fujitsu Scientific and Technical Journal, Sep., 1981.

D.M Burns, V.M. Bright, "Nonlinear Flexures for Stable Deflection of an Electrostatically Actuated Micromirror", SPIE vol. 3226, 1997.

* cited by examiner

TILING OF OPTICAL MEMS DEVICES

FIELD OF THE INVENTION

This application is related to optical switches and more particularly microelectromechanical systems (MEMS) optical switches.

BACKGROUND OF THE INVENTION

Advances in thin film technology have been leveraged to create devices using microelectromechanical systems (MEMS) elements. MEMS elements are typically capable of motion or application of a force. Devices using MEMS elements have been developed for a wide variety of applications due to their low cost, high reliability and extremely small size. MEMS elements have been utilized as microsensors, microgears, micromotors and other microengineered components. One important application of such MEMS devices has been in free-space optical switches for fiber optic communications systems. MEMS optical elements, e.g., in the form of rotatable MEMS mirrors, are arranged in square or rectangular arrays called a switch fabric. The switch fabric is aligned with two or more corresponding arrays of optical fibers. The mirrors move into position in which they can selectively couple light from a fiber in one array to a fiber in another array.

In one type of prior art free-space optical switch; MEMS mirrors are attached to a substrate by flexures. The mirrors rotate under the influence of magnetic force from an "OFF" position substantially parallel to the substrate to an "ON" position substantially perpendicular to the substrate. In the "ON" position, the mirror intercepts an optical beam from a fiber in an input array and deflects the beam toward a fiber in an output array. A top chip attached to the substrate has openings that align with the MEMS mirrors. The openings in the top chip provide reference stopping planes for the MEMS mirrors so that they are properly aligned perpendicular to the substrate in the "ON" position. A voltage applied between a particular mirror and the top chip provides an electrostatic force that retains the mirror in the "ON" position.

When scaling to larger optical switch fabrics (e.g., 16×16, 32×32), the yield of the optical MEMS die will decrease with the increasing die size. This places a feasible upper bound on such scaling. One proposed solution to this problem is to develop a new technology with a finer pitch and, therefore, a smaller die. Unfortunately this is a lengthy development process. Another alternative solution is to use redundant mirrors on the device die. Unfortunately, this complicates the overall design of the optical switch.

It is known to tile two or more smaller dies together to form a larger device. For example, Minowa et al. uses four 4×4 arrays tiled together in a mosaic fashion to form an 8×8 array. However, for 16×16 arrays and larger, the size of the array still presents problems even if smaller devices are tiled together. For example, as the array size increases the distance between input and output fibers increases. The increased optical path between the fibers can lead to undesirable beam spreading. The beam spreading may be overcome by placing collimator lenses between the arrays. However, the alignment of the collimator lenses to the switching elements is difficult and even slight misalignment will result in optical loss that degrades switch performance. Another problem with tiling two or more dies is that the dies must be very accurately aligned with each other in order to ensure that the mirrors on one die will align with those on the other dies in the mosaic.

Prior art alignment techniques include self-alignment and active-alignment. In self-alignment, metallized bonding pads are placed on two different pieces, e.g. a MEMS device die containing rotating mirrors and a corresponding top chip. Solder is applied to the bonding pads and the two pieces are brought together such that corresponding bonding pads roughly align with each other. When solder is heated through reflow, surface tension forces between the solder and the bonding pads pull the two pieces into alignment. In active-alignment, the pieces are placed, within micron tolerances, using a pick and place tool and held in place until the solder freezes. Active-alignment allows for the use of epoxies as well as solders for attachment of the top chip to the device die.

However, even using these techniques, alignment can be particularly problematic with a tiled device having four 8×8 MEMS mirror arrays totaling 256 MEMS mirrors.

Thus, there is a need in the art, for a self aligned or actively aligned optical MEMS device and a method for making it.

SUMMARY OF THE INVENTION

The disadvantages associated with the prior art may be overcome by the present invention directed to an optical microelectromechanical system (MEMS) device and a method for making it. The device generally includes a substrate with two or more device dies attached to the substrate. Each device die includes one or more microelectromechanical (MEMS) optical elements. By way of example, each MEMS optical element may be a movable mirror. A common clamping die is attached to the device dies such that each MEMS optical element aligns with a corresponding clamping surface on the common clamping die.

The device dies may be arranged in any suitable fashion. For example, four device dies may be tiled together in a 2×2 configuration. If each device die has an N×N array of MEMS optical elements, the resulting device may provide a 2N×2N array. Additional dies may be added to create switches based on more than four device dies. Each MEMS optical element may be attached to its device die by one or more flexures. If the flexures have sufficient amount of play the MEMS optical elements can register to the common clamping die when a clamping force is applied between the MEMS optical element and the corresponding clamping surface of the common clamping die. The flexures may be created from the substrate or deposited thereon.

In some embodiments of the invention, the common clamping surface may be a monolithic structure such as a MEMS top chip. One or more collimators, e.g., collimator arrays or individual collimator lenses may be disposed along the sides of the MEMS device and optionally between two adjacent device dies. The optional lenses between adjacent device dies may be configured with unique focal lengths to provide lightpath beam equalization across all channels of the switch. Specifically, lenses in each row and column can be selected to balance the length of the lightpath across the switching matrix, addressing the divergence in shortest and longest switching paths across the matrix. The substrate and/or common clamping surface may include slots for receiving the one or more collimators.

According to the method, a MEMS device may be made by attaching to a substrate two or more device dies, each device die having one or more MEMS optical elements, and attaching a common clamping die to the two or more device dies. The device dies may be attached to the substrate before attaching the common clamping die to the device dies. Alternatively, the common clamping die may be attached to the device dies before the device dies are attached to the substrate. The device dies may also be pre-tested prior to attachment to the substrate or common clamping surface. A solder may be used for both attachment steps. If so, it is desirable that the later attachment step takes place at a lower temperature than the solder reflow temperature. Alternatively, an epoxy may be used with active-alignment for one or both attachment steps.

Embodiments of the present invention provide for high yield and accurate alignment in a MEMS device having a large number of MEMS optical elements. A plurality of smaller optical MEMS dies may be manufactured with a higher individual yield than a larger single die. Consequently, where a plurality of smaller device die make up a MEMS device having the same area as a larger die, the overall yield for the resulting tiled MEMS device is greater than for a comparable device made with a single large device die. A single larger clamping die, which covers all the MEMS elements on the smaller device dies, forces the MEMS mirrors to register to even better accuracy, in the "ON" state, than with solder self-alignment alone. A simple semiconductor process may be used to fabricate the larger clamping die. Thus, the clamping die does not present the same yield problems as the more complicated optical MEMS device dies.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention. Like numbers refer to like elements throughout.

Figure 1A:
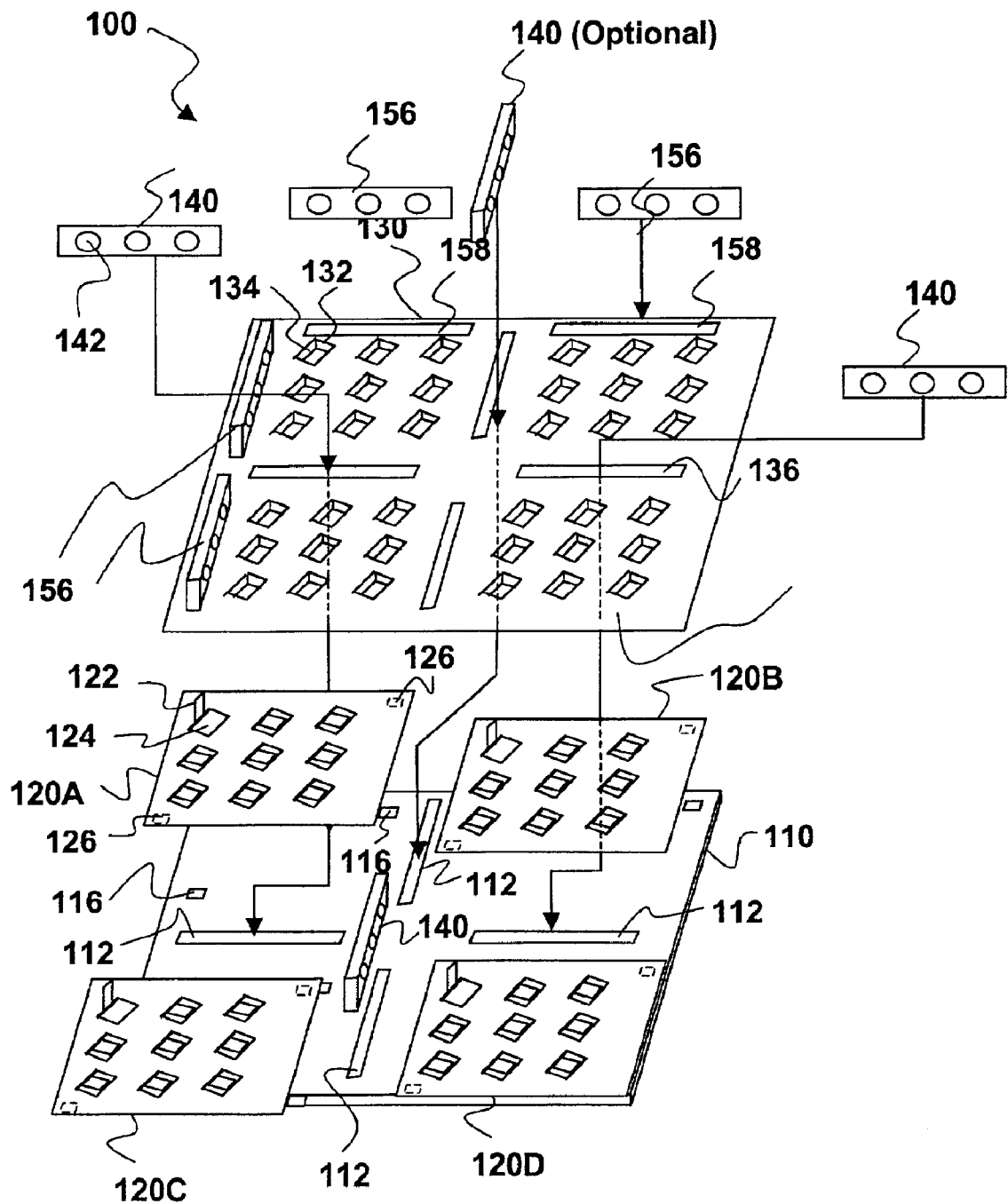
FIG. 1A is an exploded isometric diagram of a MEMS device according to a first embodiment of the present invention.
Figure 1B:
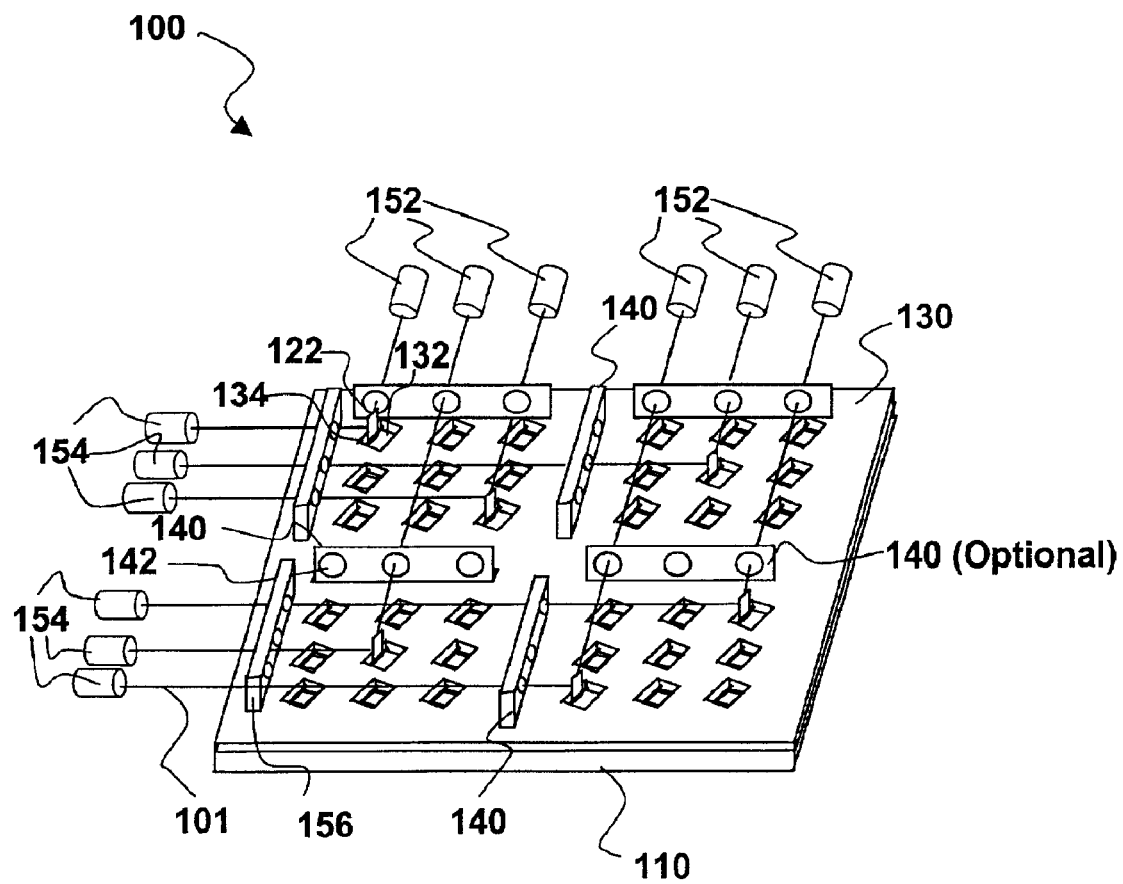
FIG. 1B is an isometric assembly diagram of the MEMS device of FIG. 1A.

FIG. 1A depicts an exploded isometric diagram of a MEMS device 100 according to a first embodiment of the present invention. An assembly diagram of the device 100 is depicted in FIG. 1B. The device 100 may be used, for example, as an optical switch, as shown in FIG. 1B. The device 100 may selectively couple optical signals 101 between a first set of optical input/output (I/O) ports 152 and a second set of I/O ports 154 as shown in FIG. 1B. The I/O ports 152, 154 may be collimator lenses, such as graded refractive index (GRIN) lenses that couple the optical signals 101 to and from optical fibers (not shown). To facilitate optical coupling to the I/O ports 152, 154, the device 100 may include collimator arrays 156 that are disposed along the perimeter of the device 100. The device 100 generally includes a substrate 110, MEMS device dies 120A, 120B, 120C, 120D, and a common clamping die 130. Each MEMS device die 120A, 120B, 120C, 120D may have an array of MEMS optical elements 122. By way of example, each optical element 122 may be in the form of a flap attached to the rest of the device die by one or more flexures 124. The flap may include a reflective surface so that it may act as a MEMS mirror. The optical element 122 may move between an "OFF" position and an "ON" position under the influence of an actuating force, such as a magnetic force. By way of example the optical elements 122 may be oriented substantially parallel to the substrate 110 in the "OFF" position and substantially perpendicular to the substrate in the "ON" position. In the "ON" position, the optical elements 122 deflect the optical signals 101.

By way of example each of the four device dies 120A, 120B, 120C, 120D includes a 3×3 array of MEMS optical elements 122. When assembled the four device dies are arranged in a 2×2 tiled configuration to provide a device 100 with a 6×6 array of MEMS optical elements. The tiling concept may be extended to encompass any number of device dies greater than one. The device dies 120A, 120B, 120C, 120D may be of almost identical appearance and construction, with the possible exception of the routing of electrical circuits to the MEMS optical elements 122 and or the placement of bond pads (not shown).

The device dies 120A, 120B, 120C, 120D are attached to the substrate 110. The device dies 120A, 120B, 120C, 120D may be accurately self-aligned to the substrate 110, e.g., to within a few microns using known solder attachment processes. Alternatively, the device dies may be accurately aligned by active-alignment and bonded using a solder or epoxy. Because each device die contains a relatively small number of MEMS optical elements 122, each of the device dies may be manufactured by a process having a higher yield than a process for producing a larger single device die having the same total number of MEMS optical elements as the device 100. Thus, the overall yield for the tiled MEMS device 100 is greater than for MEMS device made with a single large device die covering the same area and having the same number of MEMS elements.

To facilitate attachment to the substrate 110, each device die may include on a backside one or more metallized bonding pads 126 (shown in phantom). The bonding pads 126 may align with corresponding metallized bonding pads 116 on the substrate 110.

The common clamping die 130 may be in the form of a "top chip" having openings 132 that may receive all of the optical elements 122 of the device dies 120A, 120B, 120C, 120D. The openings 132 may include clamping surfaces 134 in the form of sidewalls. The clamping surfaces 134 provide reference stopping-planes for the MEMS optical elements 122. The clamping die 130 may include clamping surfaces 134 in the form of a single vertical wall or two vertical walls with a hole therebetween to allow light to pass. Such a vertical wall or walls may be higher than the MEMS optical elements 122. Clamping die 130 may also contain a magnetic pole piece and/or be bonded to substrate 110 at perimeter referential locations to enable clamping surface 134 positioning structures that extend downward second substrate clamping die 130. Finally, positioning structure clamping surface walls 134 may form an air gap between the substrate 110 and the optical elements (not shown).

A voltage may be applied between individual optical elements 122 and the common clamping die 130 to electrostatically clamp the optical elements 122 in the "ON" position. The voltage may be applied through an elongated oval shaped hairpin tether device or any flexure 124 to optical elements 122. Optical elements 122 may contain restriction tabs that contact the positioning structure walls or clamping surfaces 134 when in the "ON" position. The optical elements 122 may be electrically insulated from the clamping surfaces 134 by an insulating gap, such as an air gap.

The larger common clamping die 130 may be manufactured by a simple semiconductor process, and thus does not present the same yield problems as the more complicated MEMS device dies 120A, 120B, 120C, 120D. Furthermore, since the clamping surfaces 134 are all formed on the same clamping die 134 the common clamping die 130 very accurately registers the individual MEMS optical elements 122 on the different device dies 120A, 120B, 120C, 120D. This facilitates accurate alignment of the MEMS optical elements 122 to the I/O ports 152, 154. Even if one or more of the device dies is slightly misaligned with respect to the others, the optical elements 122 will still register to the clamping die 130 as long as there is sufficient play in the flexures 124 to accommodate the misalignment. The collimators 156 may be disposed along the sides of the device 100. The collimators 156 may couple light into and out of fiber associated with each switching channel. Device 100 may be configured with two, three or four sides of switching channels and collimators 156 may be in the form of collimator arrays or individual collimator lenses, e.g., ball lenses, microlenses, and the like. The collimators 156 may fit into slots 158 in the clamping die 130 to align them with the optical elements 122. Collimators 156 may also be actively aligned whereby each lens manipulated actively via control signals to optimize coupling into the fiber input/output channels.

Depending upon the size of the device dies 120A, 120B, 120C, 120D it may be desirable to counteract beam spreading over long optical path lengths through the device 100. To facilitate this collimators 140 may optionally be disposed between adjacent device dies. Each collimator includes lenses 142. The lenses 142 may be any suitable type of lens such as GRIN lenses, ball lenses, microlenses, and the like. The collimators 140 may be in the form of pre-assembled collimator arrays or individual lenses. The collimators 140 may be aligned with the optical elements 122 using through-slots 136 in the clamping die 130. The through-slots 136 allow the collimators 140 to be inserted after the clamping die 130 has been attached to the device dies 120A, 120B, 120C, 120D. The substrate 110 may include corresponding slots 112 to allow some vertical adjustment in the positioning of the collimators.

Depending upon the configuration of the optical switch, it may be desirable to accommodate signal regeneration, attenuation, power monitoring, wavelength switching and wavelength detection feature functions. To facilitate these and other feature functions, collimators 140 and/or collimators 156 may be replaced with a feature module that includes the suitable type of detectors, filters, actuators and sensors to support the accommodated function. Feature module may perform collimation in addition to its feature function and be aligned with the optical elements 122 using through-slots 136 in the clamping die 130. The through-slots 136 allow the feature modules to be inserted after the clamping die 130 has been attached to the device dies 120A, 120B, 120C, 120D. The substrate 110 may include corresponding slots 112 to allow some vertical adjustment in the positioning of the feature module.

Figure 2:
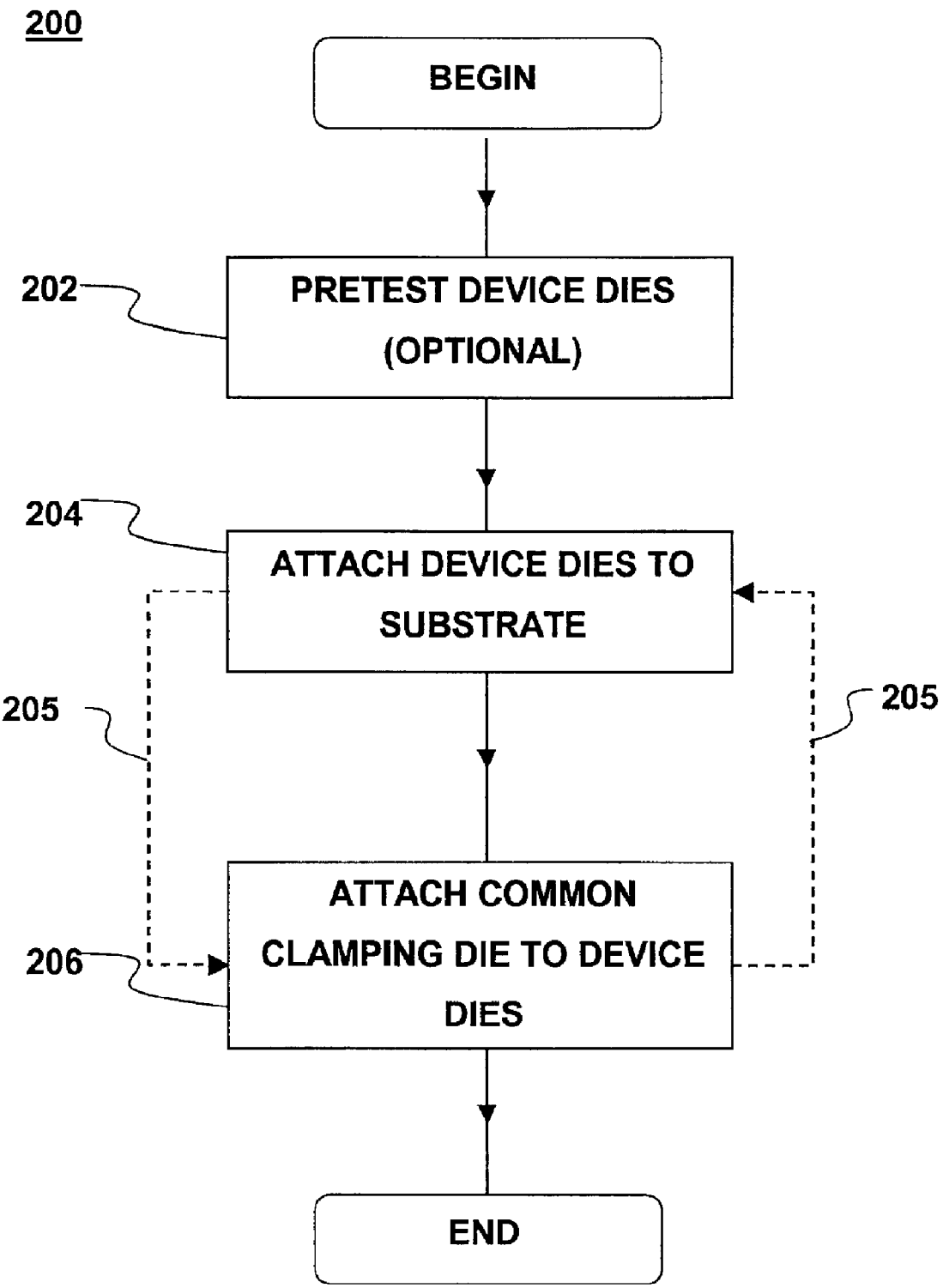
FIG. 2 is a flow diagram of a method of making a MEMS device according an embodiment of the present invention.

MEMS devices of the type shown in FIGS. 1A–1B may be manufactured according to an inventive method 200 according to a second embodiment of the invention. The steps of the method 200 are illustrated in the flow diagram of FIG. 2. For the purposes of example, the steps of the method 200 are described below with respect to the device 100 of FIGS. 1A–1B. The method begins with the fabrication of MEMS device dies 120A, 120B, 120C, 120D by standard semiconductor processes. At an optional step 202, the device dies may be tested prior to further assembly to ensure proper operation.

At step 204, the device dies are attached to the substrate 110. By way of example, the device dies 120A, 120B, 120C, 120D may be attached with a solder attachment process. For example, the metallized bonding pads 116, 126 react with a solder to form strong self-aligned bonds. The bonding pads 116 on the substrate 110 are preferably defined with the highest resolution processes available (e.g., thin film technology on ceramic substrate). In addition, the metallized bonding pads 126 on the backside of the MEMS device die 120 may be formed by patterning and etching with semiconductor photolithographic processes. The type of metal used in the bonding pads may depend on the type of solder. For example, if a Pb/Sn eutectic is used as the solder, a Cr/Ni/Au layer could be used as the patterned metal thin film on the device dies 120A, 120B, 120C, 120D and substrate 110. Once the metallized bonding pads 116, 126 are defined, the solder may be applied, e.g., in paste form, to the substrate 110 or device dies 120A, 120B, 120C, 120D. The device dies are then placed on the substrate 110, such that the bonding pads 116 on the substrate 110 align with the bonding pads 126 on substrate 120. This may be accomplished, e.g., with a standard "pick and place" tool. The solder is heated through reflow, e.g., with a belt furnace. This allows the solder to react to the metal, of the bonding pads, pulling the device die into a preferred alignment, accurate, e.g., to a few microns.

Preferably, the bonding pad pattern on the substrate and die will maximize the surface to volume ratio of solder after reflow. A large number of small solder bumps (and thus small metal pads) are preferred. This tends to enhance the solder surface tension effects for a given amount of solder. Furthermore, to improve angular alignment of a given device die, it is desirable to place the solder acting to align the device die as far from the centroid of the die as possible. In addition, a sufficient amount of solder must be used to obtain sufficient alignment.

Alternatively, the device dies 120A, 120B, 120C, 120D may be attached to the substrate 110 using an active-alignment process. For example, each of the device dies may be accurately placed, e.g., to within a few microns, on the substrate 110 using a pick and place tool. An example of a suitable pick and place tool is a KS model number FC150 manufactured by Karl Suss of Germany. The device dies 120A, 120B, 1120C, 120D may be held in place by surface tension with respect to the substrate 110. A solder, placed e.g., on the bonding pads 116, 126, is heated through reflow. The device dies are held in place until the solder cools and freezes. Alternatively, an epoxy may be used to bond the device dies to the substrate. If an epoxy is used, the device dies may be aligned without the use of metallized bonding pads.

After the device dies 120A, 120B, 120C, 120D are attached to the substrate 110, the common clamping die 130 may be attached to the device dies in step 206. In order to improve the inter-die alignment of the MEMS optical elements 122, when in the "ON" state, a single monolithic clamping die 130, e.g., a "top chip", can be used. The semiconductor processes typically used to fabricate a top chip are simple, and so yields for large clamping die are less of a concern than for device dies. The clamping die 130 may be bonded to the MEMS device dies, again using a technique that provides very accurate alignment. In a preferred embodiment, the clamping die 130 is attached using an active alignment process in which a pick and place tool-places the clamping die 103 over the device dies and holds it there as solder is heated and cooled. The attachment method for the clamping die 130 must be at a lower temperature than the temperature used for attaching the optical MEMS die to the substrate e.g., to keep the solder holding the device dies 120A, 120B, 120C, 120D to the substrate 110 below the solder reflow temperature. Provided there is enough "play" in the mechanical flexures 124 of the MEMS optical elements 122, the optical elements 122 will be able to register to the clamping die (clamping is most likely achieved electrostatically). As the clamping die 130 is a monolithic structure, the inter-die alignment of the MEMS optical elements 122 will be superior. Subsequent assembly of the device 100 may proceed according to standard processes.

The order of steps 204 and 206 is not critical and may be reversed as indicated by the dashed arrows 205. Specifically, the common clamping die 130 may be attached to the device dies (or vice versa) before attaching the device dies to the substrate 110. Of course, if step 206 takes place before step 204 it is important that the device dies are attached to the substrate by a process that takes place at a lower temperature than the process for attaching the clamping die 130 to the device dies. The device dies 120A, 120B, 120C, 120D may be self aligned to the common clamping die 130 using solder and metallized bonding pads on the backside of the clamping die and the front sides of the device dies.

While the above is a complete description of the preferred embodiment of the present invention, it is possible to use various alternatives, modifications and equivalents. For example, in the embodiment depicted in FIGS. 1A–1B each of four device dies 120A, 120B, 120C, 120D contains a 3×3 array of optical elements 122. The device 100 is shown this way for the sake of clarity. The invention is not limited to four device dies having 3×3 arrays of MEMS optical elements. For example four device dies each having an N×N array of MEMS optical elements may be arranged in a 2×2 tiled configuration to form a MEMS device having a 2N×2N array, where N is an integer greater than or equal to 1. Furthermore, two or more device dies having any number of optical elements may be used without departing from the scope of the present invention. Therefore, the scope of the present invention should be determined not with reference to the above description but should, instead, be determined with reference to the appended claims, along with their full scope of equivalents. The appended claims are not to be interpreted as including means-plus-function limitations, unless such a limitation is explicitly recited in a given claim using the phrase "means for."

What is claimed is:

1. An optical microelectromechanical system (MEMS) device, comprising:

a substrate two or more device dies attached to the substrate; and a common clamping die attached to the two or more device dies, wherein each device die includes one or more microelectromechanical optical elements;

wherein each microelectromechanical optical element aligns with a corresponding clamping surface on the common clamping die, wherein the common clamping die is a MEMS top chip.

2. The device of claim 1 further comprising one or more collimators disposed between two adjacent device dies.

3. The device of claim 2, wherein the one or more collimators are in the form of individual collimator lenses or a collimator array.

4. The device of claim 2, wherein one or more of the substrate and the common clamping surface includes a slot for receiving the one or more collimators.

5. The device of claim 4, wherein the clamping surface includes a through-slot, whereby the one or more collimators may be inserted after the clamping surface has been attached to the device dies.

6. The device of claim 1, wherein each optical microelectromechanical element is a movable mirror.

7. The device of claim 1, wherein the clamping die is a monolithic structure.

8. The device of claim 1, wherein each microelectromechanical optical element is attached to its device die by one or more flexures.

9. The device of claim 8, wherein one or more flexures have sufficient play to allow the microelectromechanical optical element to register to the common clamping die when a clamping force is applied between the microelectromechanical optical element and the corresponding clamping surface of the common clamping die.

10. The device of claim 1, wherein the two or more device dies include four device dies arranged in a 2×2 tiled configuration.

11. The device of claim 10, wherein each of the four device dies includes an N×N array of microelectromechanical optical devices, wherein N is an integer greater than or equal to 1, whereby the device forms a 2N×2N array of microelectromechanical devices.

12. The device of claim 1, further comprising one or more collimators disposed along at least one side of the device.

13. The device of claim 12, wherein the one or more collimators are in the form of individual collimator lenses or a collimator array.

* * * * *